United States Patent [19]

Chalmers et al.

[11] Patent Number: 4,738,304

[45] Date of Patent: Apr. 19, 1988

[54] DIRECT CONDENSATION RADIATOR FOR SPACECRAFT

[75] Inventors: Douglas R. Chalmers; John J. Pustay, both of Mercer County, N.J.

[73] Assignee: RCA Corporation, Princeton, N.J.

[21] Appl. No.: 838,671

[22] Filed: Mar. 12, 1986

[51] Int. Cl.$^4$ .................. F28F 11/00; F28F 27/02; B64G 1/56; B64G 1/44

[52] U.S. Cl. .................. 165/13; 165/11.1; 165/41; 165/70; 244/158 R; 244/163

[58] Field of Search .............. 165/41, 70, 13, 11.1; 244/158 R, 163, 117 A

[56] References Cited

U.S. PATENT DOCUMENTS

| | | | |
|---|---|---|---|
| 3,211,215 | 10/1965 | Walker | 165/46 |
| 3,239,164 | 3/1966 | Rapp | 244/117 A |
| 3,435,889 | 4/1969 | Bienert | 165/105 |
| 3,517,730 | 6/1970 | Wyatt | 165/32 |
| 3,532,158 | 10/1970 | Hiebert | 165/47 |
| 4,161,212 | 7/1979 | Hightower | 165/96 |
| 4,516,631 | 5/1985 | Russell | 165/47 |

FOREIGN PATENT DOCUMENTS

| | | | |
|---|---|---|---|
| 23798 | 2/1982 | Japan | 165/11.1 |
| 572889 | 10/1945 | United Kingdom | 165/70 |
| 452718 | 12/1974 | U.S.S.R. | 165/11.1 |

Primary Examiner—Albert W. Davis, Jr.
Assistant Examiner—John K. Ford
Attorney, Agent, or Firm—Clement A. Berard, Jr.; William H. Meise

[57] ABSTRACT

Cost and weight of a heat transfer structure for a space vehicle can be reduced by an arrangement of redundant channels for the flow of coolant to heat radiating panels, micrometeroid resisting bumpers located adjacent the channels for preventing penetration by all but the most energetic micrometeroids, and a sensing and control arrangement for sensing the penetration of a coolant channel for shutting off that channel to prevent loss of coolant.

12 Claims, 15 Drawing Sheets

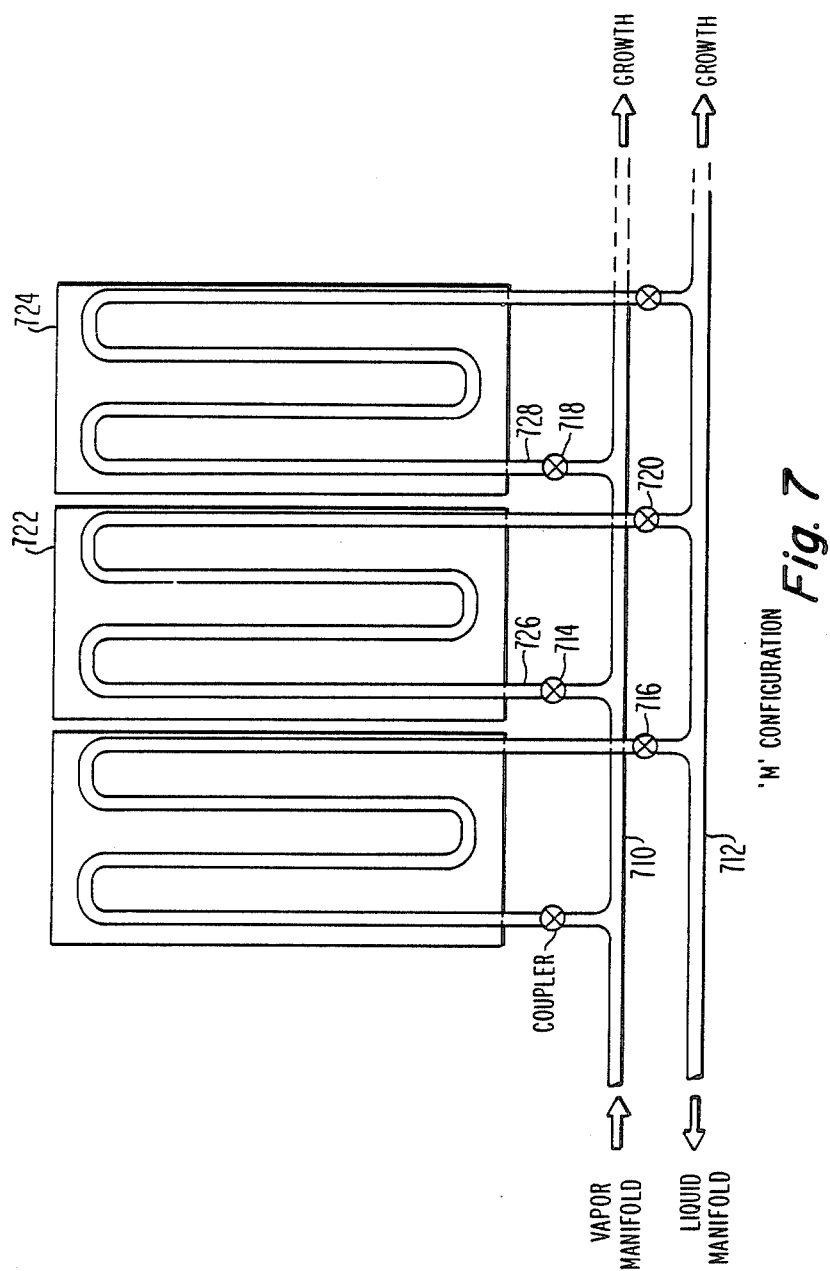

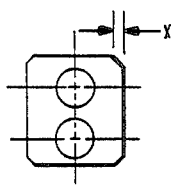
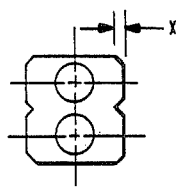
Fig. 11a     Fig. 11b
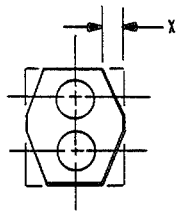
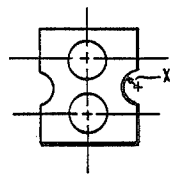
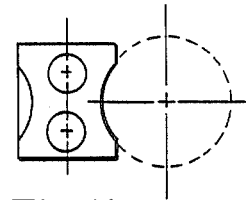
Fig. 11c     Fig. 11d     Fig. 11e
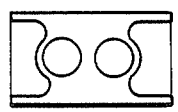
Fig. 11f     Fig. 11g
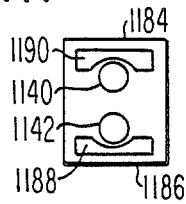
Fig. 11h

DIRECT CONDENSATION RADIATOR FOR SPACECRAFT

BACKGROUND OF THE INVENTION

The functions of Earth orbiting and other spacecraft require ever-increasing amounts of power as their functions and the complexity of those functions have evolved. Efforts are made to maximize the efficiency of energy use in performing these functions, but the amount of residual thermal energy required to be removed from the spacecraft structure in order to maintain a stable temperature has been increasing in designs made over a period of years. It is expected that the amount of residual power required to be removed from the spacecraft structure in the case of direct broadcast satellites will be greater than that required to be removed from current communications satellites.

Thermal energy cannot be removed from a spacecraft vehicle by conduction or convection, but only by radiation. Thus, the sources of unwanted heat on the spacecraft must be thermally coupled to radiators of sufficient size to maintain a satisfactory spacecraft temperature. In the context of a spacecraft, this thermal coupling presents unique problems. Because of the large cost of the spacecraft and of its launching, the various portions of the spacecraft which relate to the performance of its function must be highly reliable so that the cost may be amortized over the full design lifetime. Furthermore, the very large cost associated with launching the vehicle together with the desirability of maximizing the payload makes the weight of each structure of vital concern. Direct thermal coupling between the source of waste heat and its radiator is light in weight if the thermal path length is short, and is also extremely reliable. However, functional considerations may require a thermal path length which is so long that a direct thermally conductive path becomes heavier than other possible options. Heat transfer by the flow of fluid coolant between the source of waste heat and a heat radiating structure is often used. Because spacecraft travel through a flux of micrometeroids, there exists a danger that a pipe or channel through which coolant flows may be punctured, thereby resulting in the escape of coolant and loss of cooling capacity. This problem has been solved in the past by the use of a plurality of heat pipes thermally connecting the source of waste heat with the structure of the heat radiating element. Failure of one out of N heat pipes due to penetration by a micrometeroid causes a reduction in the capacity of the heat transfer system by a factor of 1/N, and does not result in total failure. The wall thickness of the heat pipes is selected by considerations of micrometeroid flux density and the desired reliability and life span.

Spacecraft having orbital paths inclined by less than about 30° relative to the equatorial plane experience a lesser micrometeroid flux density than do spacecraft in polar or nearly-polar orbits. It is desirable to reduce the cost and weight of heat radiators.

SUMMARY OF THE INVENTION

A heat radiator for a space vehicle includes a vapor manifold adapted for receiving coolant vapor to be cooled and a liquid manifold adapted for receiving cooled liquid coolant. First and second spaced-apart panels are substantially planar and parallel over a principal portion of their area. The first and second panels are formed from heat conductive material and have surfaces which radiate heat. An elongated pipe-like structure in the form of a thermally conductive thick-walled multiple-channel pipe includes first and second ends and an outer surface, and at least first and second independent channels extending from the first end to the second end. The elongated pipe-like structure lies in a plane and is located between the first and second panels with a portion of its outer surface thermally bonded to the first panel and another portion to the other surface thermally bonded to the second panel. The first end is adjacent the vapor manifold and the second end is adjacent the liquid manifold. A coupler couples the first and second ends of the pipe-like structure to the vapor and liquid manifolds for controllably coupling at least the first and second channels at one end to the vapor manifold and the other end to be liquid manifold. Micrometeroids having velocities substantially normal to the plane in which the pipe-like structure lies are most likely to penetrate through the thick walls of the pipe-like structure, thereby forming an aperture through which coolant can escape. A first elongated bumper is located on a side of the first panel remote from the pipe-like structure and is dimensioned and located for intercepting micrometeroids impinging on the first panel near the pipe-like structure from a direction normal to the plane. A second similar bumper is located on the side of the second panel remote from the pipe-like structure. An energetic micrometeroid may nevertheless penetrate through a bumper and the thick walls of the pipe-like structure, thereby forming an aperture through which the coolant can escape from a channel. A penetration sensing and control arrangement is coupled to the pipe-like structure and to the coupler for sensing the formation of an aperture through which coolant can escape and for controlling the coupler for decoupling at least one of the channels from both the vapor and liquid manifolds.

DESCRIPTION OF THE DRAWING

FIG. 7 is an elevation view of a radiator assembly with a panel removed to illustrate the multichannel pipe folded into an M configuration;

FIG. 10c is a temperature plot for the "paper clip" configuration of FIG. 8a;

FIGS. 11a–11h illustrate various cross sections of multichannel pipe which may be used in the various embodiments of the invention;

DETAILED DESCRIPTION OF THE INVENTION

Figure 1:
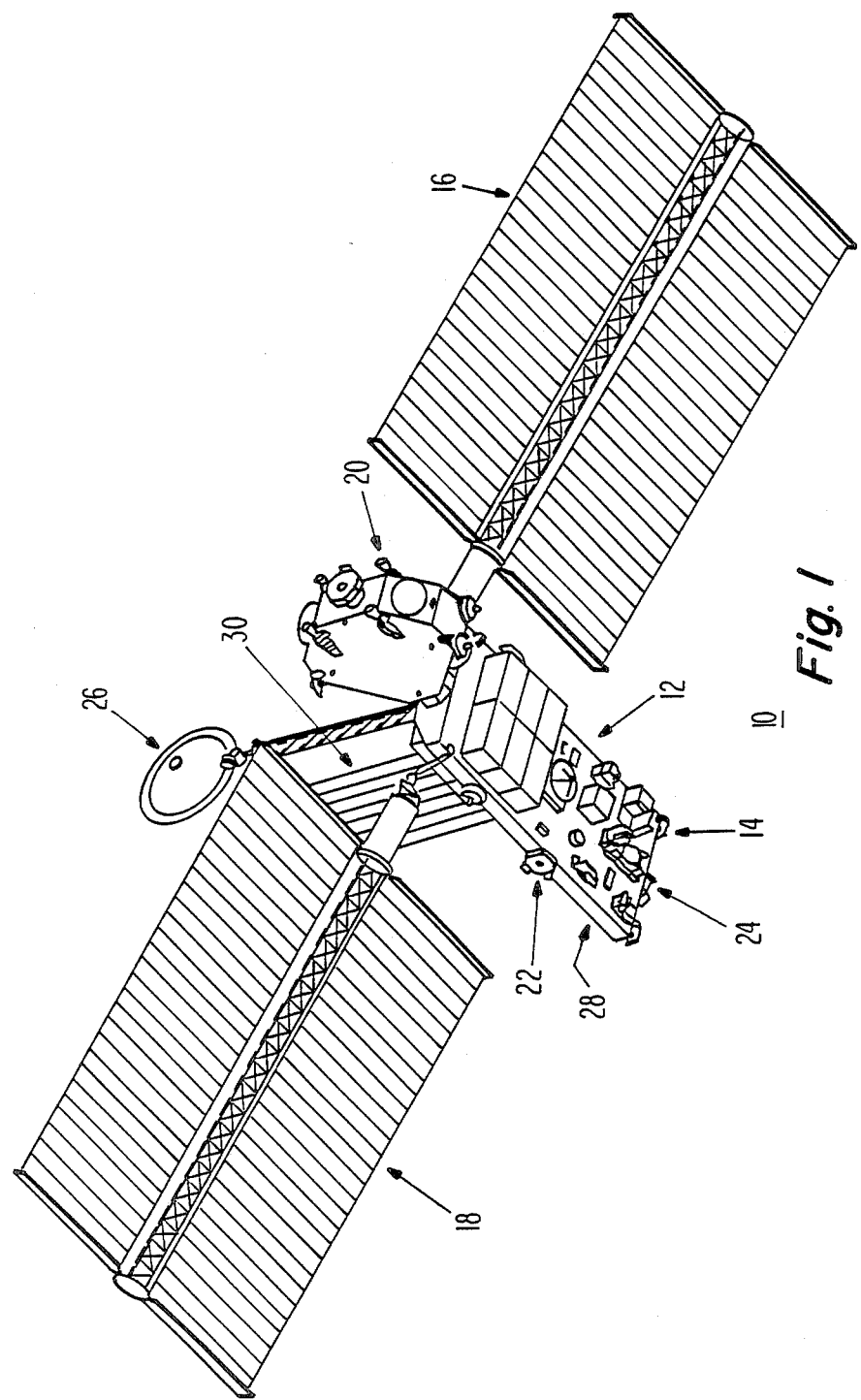
FIG. 1 is a perspective view of a spacecraft in which the invention can be used.

FIG. 1 is a perspective view of a space vehicle 10. Space vehicle 10 includes a platform or core carrier 12, a payload mounting area 14, solar panels 16 and 18, propulsion unit 20, interface 22 for orbital manned vehicle (OMV) servicing, and (SCAR) 24 for additional payload carrier. An antenna 26 provides for communication. The solar panels 16 and 18 produce electrical energy which drives the various sensors and functions of the space vehicle. As mentioned, unavoidable inefficiencies in the energy utilizing equipment result in waste heat which must be removed from the spacecraft to maintain a stable temperature. Some heat radiation is provided by body-mounted radiators located in a region 28. The locations of the body-mounted radiators may not be convenient for thermal connection to sources of waste heat, or the amount of heat radiating surface may not be adequate to the volume of waste heat to be handled. For this purpose, a further free standing heat radiator assembly illustrated as 30 is provided.

Figure 2A:
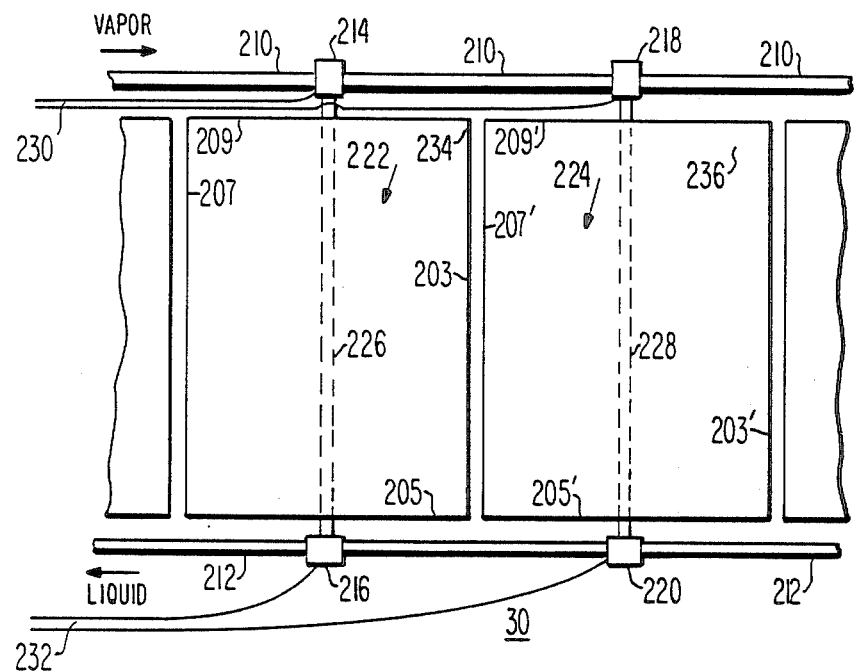
FIG. 2a is a simplified side or elevation view of a heat radiator assembly which may be used in the arrangement of FIG. 1.

FIG. 2a a side elevation view of free standing heat radiator assembly 30. As illustrated in FIG. 2a, the free standing radiator assembly includes an elongated vapor manifold, plenum or header 210 which extends the length of the radiator and which receives at its left end coolant vapor which carries with it in the form of latent heat of vaporization waste heat extracted from a source of waste heat (not illustrated). An elongated liquid manifold or header 212 runs parallel to vapor manifold 210 and receives from individual radiators or radiator panels 222, 224 . . . coolant which has been cooled into a liquid form. The liquid coolant is returned to the sources of waste heat for further cooling thereof.

Pairs of coupling units 214, 216; 218, 220 connect individual heat radiators 222, 224 to vapor manifold 210 and to liquid manifold 212. Coupling units 214–220 and other coupling units not illustrated in FIG. 2a include controllable valves and may include sensing units, as described below. Coupling units 214–220 are connected by multiconductor electrical cables illustrated as 230 and 232 to a control unit (not illustrated in FIG. 2a). A thermally conductive multi-channel pipe 226 is connected to coupling units 214 and 216 to allow coolant to flow from manifold 210 to manifold 212. Similarly, a thermally conductive multi-channel pipe 228 is connected to coupling units 218 and 220 for allowing coolant to flow from manifold 210 to manifold 212. Separate thermally conductive panels 234 and 236 are thermally bonded to multi-channel pipes 226 and 228, respectively, on the side facing the viewer in FIG. 2a. At least those sides of panels 234 and 236 facing into space are capable of substantial radiation, either inherently or by virtue of a radiation-enhancing surface treatment or coating, as known in the art. This radiation is of the type known as "black-body" or "grey-body" radiation.

Panel 234 has an edge 209 facing manifold 210, an edge 205 facing manifold 212, an edge 207, and an edge 203 facing radiator 224. Similarly, radiator panel 236 of radiator 224 has edges 209' and 205' facing manifolds 210 and 212, respectively, an edge 203', and an edge 207' facing edge 203 of radiator 222.

As coolant vapor flows from manifold 210 through coupling unit 214 to pipe 226, it warms pipe 226 and panel 234 thermally bonded thereto to thereby heat the panel and cause radiation into space. The radiation carries the heat away from the panel, thereby cooling both the panel and the coolant vapor. At some point along pipe 226, the latent heat of vaporization of the coolant is fully absorbed by the panels and radiated, and the coolant condenses to a liquid form. The liquid continues to flow through pipe 226 towards coupler 216. The extraction of heat continues, thereby extracting sensible heat from the coolant to reduce the temperature of the liquid. Cooled liquid arrives at coupler 216 and is supplied through coupler 216 to liquid manifold 212. Individual radiator 224 operates in the same way to radiate heat and to cool the coolant vapor in order to condense it to a liquid form, to cool the liquid and to supply the liquid coolant to manifold 212. It is apparent that radiators 222 and 224 and the other individual radiators (not illustrated in FIG. 2a) operate in parallel to provide the necessary heat capacity.

Spacecraft 10 (FIG. 1) orbits through a flux of micrometeroids. The magnitude of the flux may change with time and with orbital position. Some micrometeroids will strike the radiator panels, manifolds and coupling units. Most micrometeroids have insufficient kinetic energy to damage any portion of the structure of FIG. 2a. There may be extremely energetic micrometeroids whose kinetic energy is large enough to damage any portion of the spacecraft, no matter how sturdy. However, it is extremely unlikely that such energetic micrometeroids will strike or damage portions of the structure. Manifolds 210 and 212, and coupling units 214–220 may be made sturdy enough to withstand any micrometeroid which is likely to strike them. Radiators 222 and 224 are very large in order to provide sufficient surface area for radiation of the waste heat. Multi-channel pipes 226 and 228 may have a projected surface area which is a sufficiently large proportion of the total radiating area of radiators 222 or 224 so that the structural weight required to reinforce them against puncture by any conceivable micrometeroid is more than the weight required to provide (a) a moderate amount of protection against puncture, together with (b) adaptive shutdown.

Figure 2B:
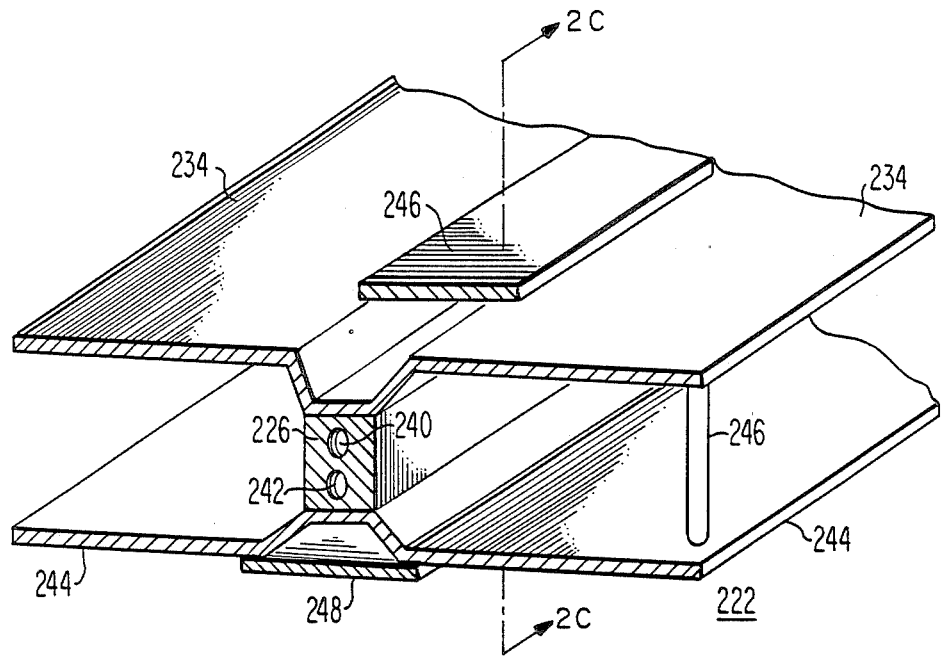
FIG. 2b is a perspective view of a cross section, partially cutaway away, of one radiator of the structure illustrated in FIG. 2.

FIG. 2b is a perspective view of a section of individual radiator 222 of FIG. 2a. In FIG. 2b, radiator 222 includes multi-channel pipe 226 having two channels designated as 240 and 242. Pipe 226 has a rectangular cross section. As illustrated, panel 234 is substantially planar over most of its surface area, but is bent to form a flat-bottomed U-shape in the region in which it contacts the outer surface of pipe 226. Panel 234 is metallurgically or adhesively bonded to the top portion of the outer surface of pipe 226 to provide good thermal contact thereto. A second thermally conductive panel 244 is substantially planar and parallel to panel 234 over most of its surface, but is similarly bent into a flat-bottomed U-shape in the region in which it contacts the bottom part of the outer surface of pipe 226. Panel 244 is also bonded to pipe 226 to provide good thermal contact between the pipe and the panel and to support panels 234 and 244 in a fixed relationship. Additional supports such as support 246 may be provided near the outer edges of panels 234 and 244 to provide structural rigidity as necessary. At least the side of panel 244 facing away from panel 234 has a relatively high capacity for radiation of thermal energy.

As mentioned, a moderate amount of protection against penetration by micrometeroids is provided to channels 240 and 242. The amount of penetrating energy of a micrometeroid depends upon the magnitude of its velocity component which is normal to the surface which it penetrates. Those micrometeroids impinging upon pipe 226 at acute angles relative to a plane parallel to the plane of panels 234 or 244 must penetrate one of panels 234 or 244 at an acute angle, which tends to cause a ricochet of the micrometeroid, or to absorb much of the kinetic energy of the micrometeroid before it strikes pipe 226. Only those micrometeroids which strike pipe 226 from a directional approximately normal to a plane parallel to the planes of panels 234 and 244 do not pass at an acute angle through a panel before striking the pipe, and may have large velocity components perpendicular to the surface of pipe 226. A moderate amount of protection against micrometeroids arriving from such directions is provided by a pair of shields or bumpers illustrated as 246 and 248. As illustrated in FIG. 2b, bumper 246 is for illustrative purposes cut away somewhat more than bumper 248. Bumper 246 is an elongated strip of thermally conductive material coated to enhance radiation into space and bonded to the top surface of panel 234 in a position straddling the open end of the U formed by the bend in panel 234. Similarly, bumper 248 is an elongated strip bonded across the mouth of the U formed by the bend in panel 244. Micrometeroids penetrating bumpers 246 or 248 will tend to vaporize and/or disintegrate into smaller components, each having less kinetic energy than the original micrometeroid, and to cause the shower of particles to be spread somewhat over the surface area of panel 234 before striking pipe 226. This reduces the likelihood that pipe 226 will be penetrated. The surface of bumper 246 is made to radiate efficiently to guarantee that radiating efficiency is maintained over the entirety of the surface of radiator 222.

Figure 2C:
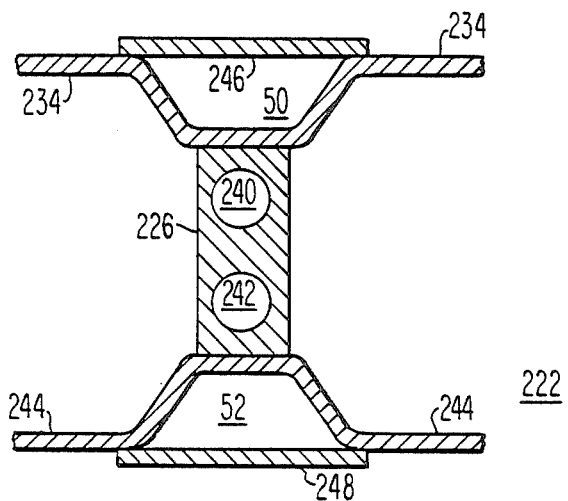
FIG. 2c is a cross section of a portion of the arrangement of FIG. 2b.

FIG. 2c is a cross section taken along lines 2c, 2c of FIG. 2b, illustrating the channel 50 formed by bumper 246 and the U-shape bend in panel 234. A similar channel 52 is formed between bumper 248 and panel 244.

Figure 2D:
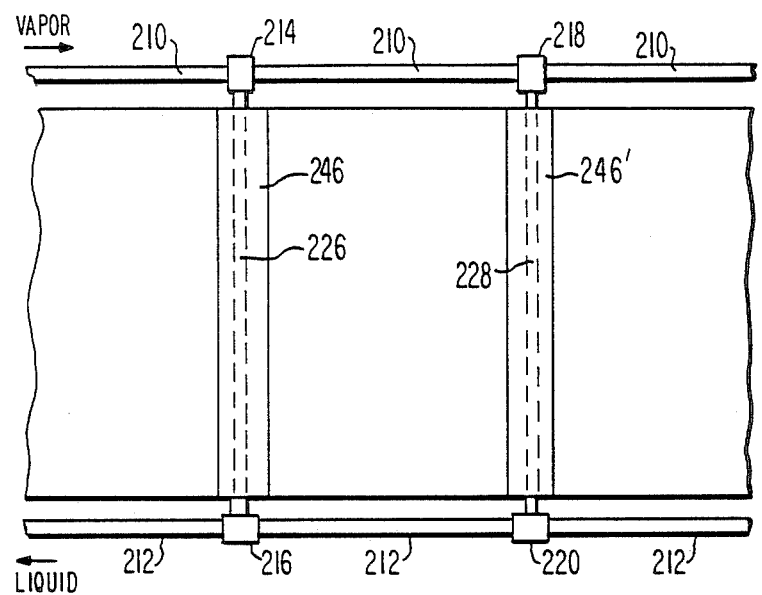
FIG. 2d is a simplified elevation view of a heat radiator assembly similar to that of FIG. 2a, but in which the panels are continuous.

FIG. 2d illustrates a structure similar to that of FIG. 2a, in which the need for additional supports such as support 246 of FIG. 2b is eliminated. In FIG. 2d, elements corresponding to those of FIGS. 2a, 2b and 2c are represented by the same reference numeral. In the arrangement of FIG. 2d, the upper panel which is visible and the lower panel (not visible in FIG. 2d) are not divided into individual radiators having panel edges such as 203, 207, 203', 207' of FIG. 2a, but instead form one continuous radiator. This tends to increase the rigidity of the structure and to provide a more even thermal distribution.

Figure 3:
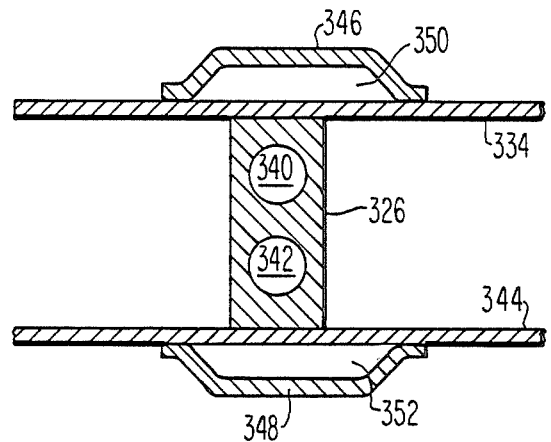
FIG. 3 is a cross-section of a portion of a heat radiator according to another embodiment of the invention.

FIG. 3 is a cross section of a portion of a radiator generally similar to that illustrated in FIGS. 2b and 3. The arrangement of FIG. 3 includes a multi-channel pipe 326 defining fluid channels 340 and 342. A cross section of the outer periphery of multi-channel pipe 326 is rectangular in configuration as in the case of pipe 226, and its upper and lower surfaces are bonded to flat panels 334 and 344, respectively. As in the case of the arrangements of FIGS. 2a, 2b and 2c, heat is conducted from the coolant through the thick walls of pipe 326 to thermally conductive panels 334 and 344. The surfaces of panels 334 and 344 radiate heat into space and thereby provide cooling. Since panels 334 and 344 are not bent near the region in which they are bonded to the outer surface of pipe 326, the thermal conductivity of the panel cannot be affected by bends. Bumpers 346 and 348 are U-shaped channels which project above and below the planes of panels 334 and 344, respectively. Bumpers 346 and 348 provide protection against micrometeroids impinging on the structure from directions normal and nearly normal to the planes of panels 334 and 344. Bumpers 346 and 348, together with panels 334 and 344, respectively, form channels 350 and 352, respectively. A structure such as that illustrated in FIG. 3 has a lower specific weight (pounds/foot) then the configuration of FIGS. 2b and 2c, and is easier to manufacture.

Figure 4:
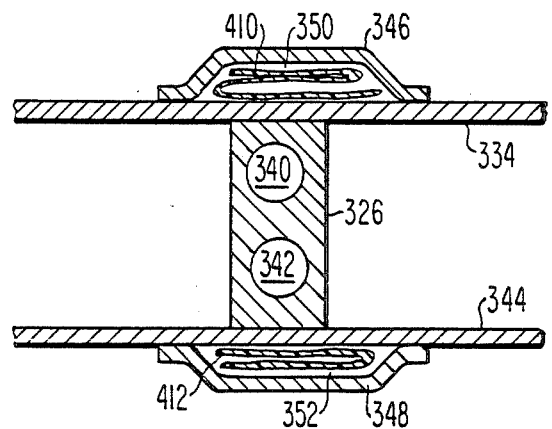
FIG. 4 is a cross section of a portion of a heat radiator according to yet another embodiment of the invention in which filler material is used in the region between the bumper and the panel.

FIG. 4 illustrates a cross section of a radiator similar to that of FIG. 3. Elements of FIG. 4 corresponding to those of FIG. 3 are designated by the same reference numeral. In the arrangement of FIG. 4, channel 350 lying between bumper 346 and panel 334, and channel 352 lying between bumper 348 and panel 344, are filled or partially filled with a material selected to absorb energy from micrometeroids which may penetrate the material. A suitable material is Kevlar film, which is used in the manufacture of bullet-proof vests.

Figure 5:
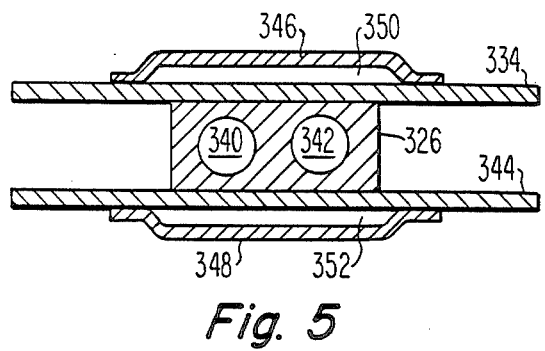
FIG. 5 is yet another cross section of a portion of a heat radiator in accordance with an embodiment of the invention with an orientation of the coolant channels which differs from that of the arrangements of FIGS. 2, 3 and 4.

FIG. 5 is a cross section of a portion of a radiator. Elements of FIG. 5 corresponding to those of FIG. 4 are designated by the same reference numeral. In the arrangement of FIG. 5, the centers of fluid channels 340 and 342 lie in a plane which is equidistant between the planes of panels 334 and 344, rather than in a plane perpendicular thereto. The advantage of this configuration lies in the lower thermal resistance between each fluid channel and the adjoining panels.

Figure 6:
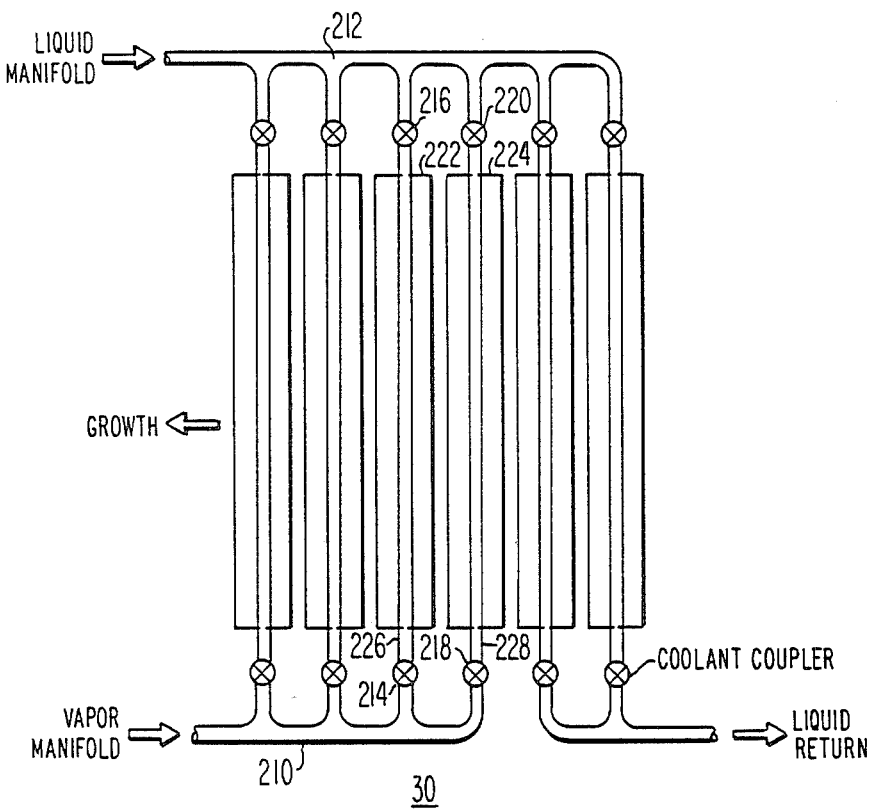
FIG. 6 is a schematic representation of the radiator assembly of FIG. 2a showing how connections are made for increasing the capacity of the assembly by adding more radiators.
Figure 10A:
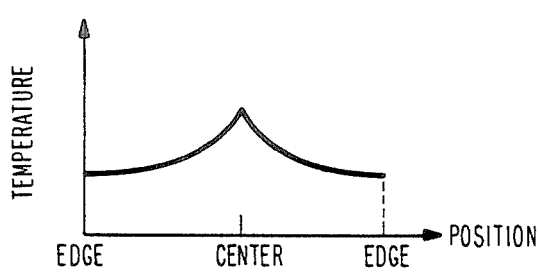
FIG. 10a is a temperature profile along the center of a radiator configured as in FIG. 2a illustrating a temperature peak attributable to the single pipe.

FIG. 6 is a side or elevation view of radiator assembly 30 of FIG. 2a, illustrating how individual radiators are added to provide growth in the thermal capacity of the radiator assembly. FIG. 10a is a plot of temperature as a function of position along an individual radiator of the arrangement of FIG. 6 along a line parallel with manifolds 210 and 212 and passing through the center of the radiator. The temperature peaks at the position of the pipe and decreases towards the edges of the panel.

FIG. 7 is a side or elevation view of a configuration for a radiator assembly which may be advantageous when the vapor and liquid manifolds are adjacent. The upper conductive panel has been removed to better illustrate the shape into which the pipes are bent. Elements of the arrangement of FIG. 7 corresponding to those of FIG. 6 are designated by the same reference numerals in the 700 series rather than in the 200 series.

Figure 10B:
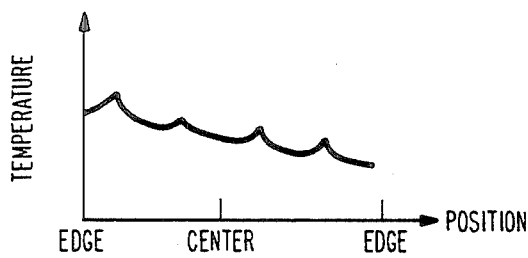
FIG. 10b is a like plot for the "M" configuration of FIG. 7.

In FIG. 7, multi-channel pipes 726 and 728 as well as other unnumbered pipes lie in a plane and are bent into the shape of the letter M so that the first and second ends of each multi-channel pipe exit from the same side of each radiator 722 and 724. Naturally, the panels making up the radiators 722, 724 may be continuous as described in conjunction with FIG. 2d for improved rigidity and thermal continuity. A disadvantage of the M configuration illustrated in FIG. 7 is that the temperature distribution across the individual radiators 722, 724 is nonuniform. FIG. 10b illustrates the temperature distribution along the center of radiator 722 at the intersection with a plane perpendicular to pipe 726. The highest temperature is associated with that portion of the multi-channel pipe nearest the vapor manifold. Maximum efficiency of the radiating area in radiating heat is achieved when the surface temperature is uniform. If the multi-channel pipes such as 726 and 728 of FIG. 7 are configured as in the cross section of FIG. 2c, and the material of the pipe is extruded 6061 aluminum, it is relatively easy to make the bends illustrated in FIG. 7 to achieve the desired M configuration. The configuration of FIG. 7 is more difficult to manufacture with a cross sectional configuration as illustrated in FIG. 5, because of the greater difficulty in making the desired bends.

Figure 8A:
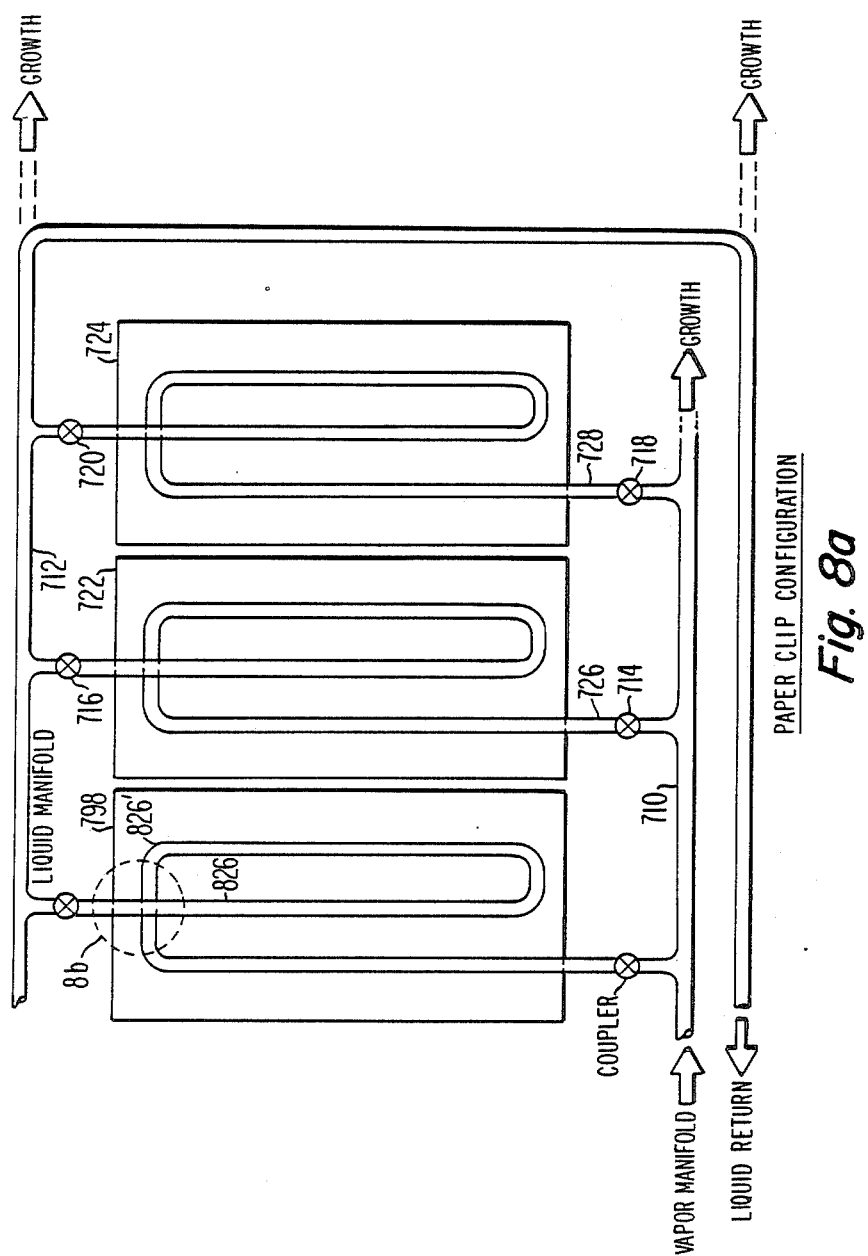
FIG. 8a is an elevation view of a radiator assembly, with a panel removed to illustrate the "paper clip" configuration of the multichannel pipe and pipe crossover.

FIG. 8a is an elevation view of a radiator assembly with the upper panels removed to illustrate the configuration of the multi-channel pipe. In FIG. 8, elements corresponding to those of FIG. 7 are designated by the same reference numeral. This configuration is termed a "paper clip" configuration because of a supposed resemblance to a conventional paper clip. The paper clip configuration is useful in conjunction with spaced apart vapor and liquid manifolds.

Figure 10C:
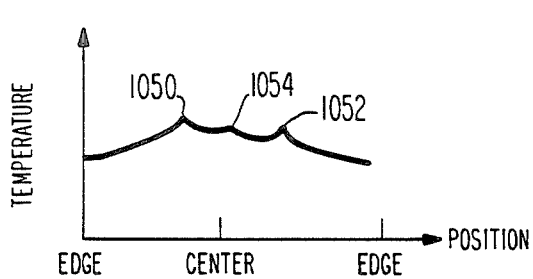

An advantage of the paper clip configuration of FIG. 8a is the relatively uniform temperature distribution across each individual radiator. As illustrated in FIG. 10c, the temperature distribution has three peaks, a first peak 1050 having the highest temperature and corresponding to that portion of pipe 726 receiving coolant from the vapor manifold, a smallest peak 1054 centered between peaks 1050 and 1052 corresponding to that portion of pipe 726 discharging cooled liquid to the liquid manifold, and a third peak 1052 at a temperature intermediate that of peaks 1050 and 1054 for the intermediate portion of pipe 726.

Figure 8B:
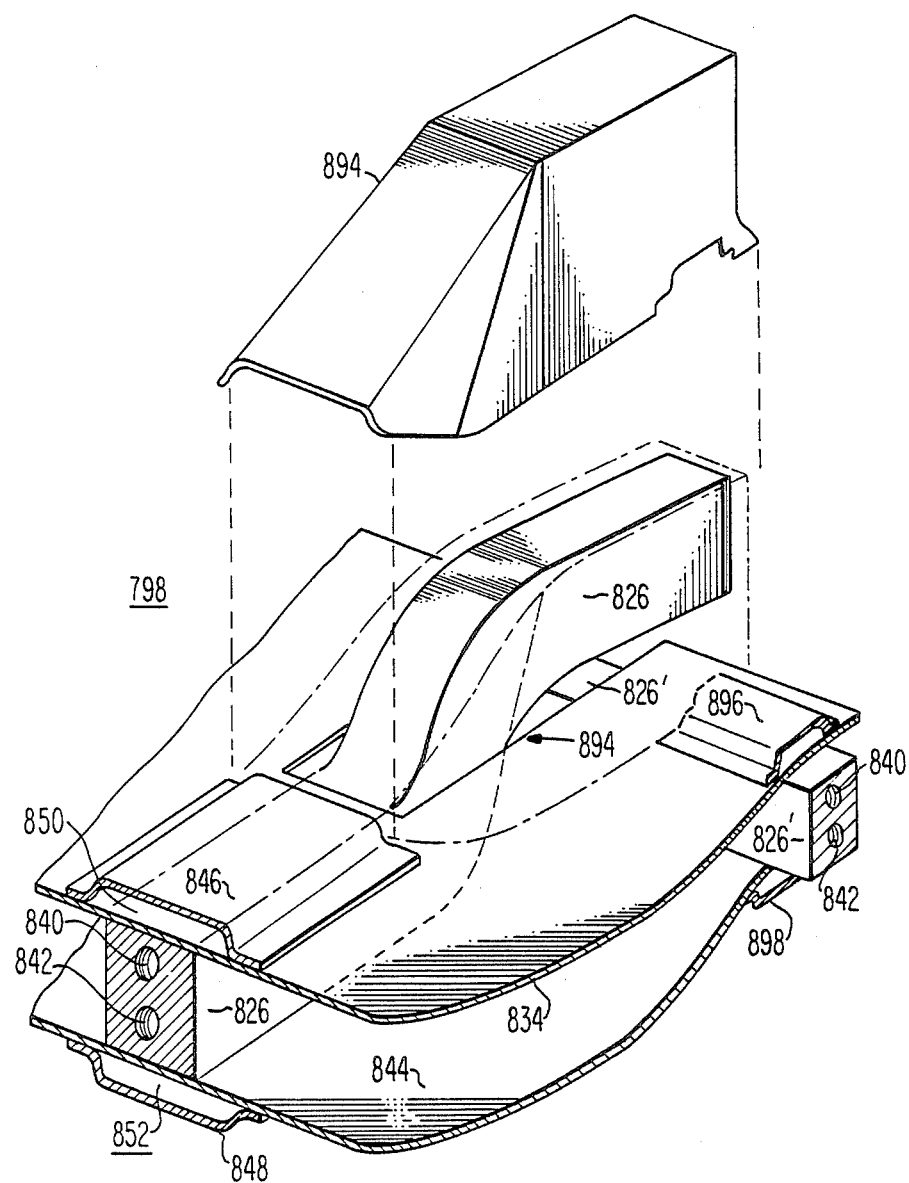
FIG. 8b is an exploded perspective view of a section of the arrangement of FIG. 8a in which the crossover occurs.

In the arrangement of FIG. 8a, the multichannel pipe associated with each radiator 722, 724, 798 crosses in a region near the liquid manifold. FIG. 8b illustrates in exploded cross-sectional perspective view the crossover region designated 8b in FIG. 8a. In FIG. 8b, radiator 798 includes a multichannel pipe 826 including first and second coolant channel 840 and 842, respectively. Multichannel heat pipe 826 appears in two different locations in FIG. 8b, corresponding to the two portions which cross over as illustrated in FIG. 8a. One of the portions of multichannel pipe 826 in FIG. 8b is designated 826, and the other portion is designated 826' for clarity. Planar thermally conductive panels 834 and 844 are mutually parallel and spaced apart by the thickness of multichannel pipe 856, to which they are thermally bonded. A rectangular cutout 894 in top panel 834 provides space for that portion of pipe 826 which is bent to clear portion 826' to protrude above the surface of the plane of panel 834. In those regions in which pipe 826 lies between panels 834 and 844, bumpers 846 and 848 provide protection against micrometeroids as described above. Similarly, in those regions in which pipe 826' lies between panels 834 and 844, bumpers 896 and 898 provide similar protection. It will be understood by comparison of FIGS. 8a and 8b that bumpers 846 and 896 together form one continuous bumper loop, and similarly bumpers 848 and 898 together form a further continuous bumper loop on the opposite side of the structure.

In the region in which multichannel pipe 826 protrudes above the plane of panel 834 in order to clear portion 826', bumpers 846 and 896 cannot provide protection. This otherwise unprotected region is protected by a larger bumper 894 formed to fit over pipe portion 826 in the exposed region. It is fastened into position as shown by phantom lines to overlie bumpers 846 and 896 to provide continuous protection. Preferably, bumper 894 is formed as a double walled bumper to provide the same degree of net protection as does the combination of panel 834 together with bumper 846.

Figure 9:
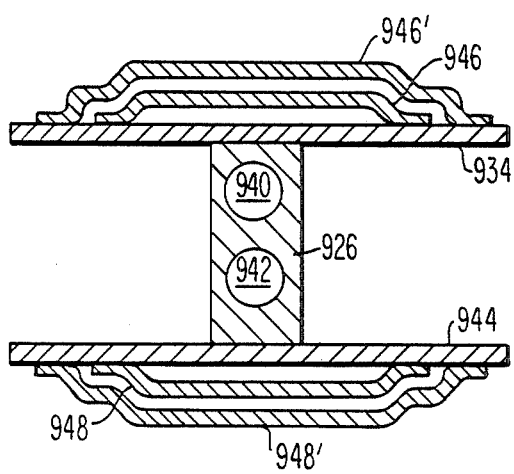
FIG. 9 is a cross-sectional view of a portion of a radiator illustrating a double-wall bumper.

FIG. 9 is a cross section of a further structure in which a double walled bumper is used to provide additional protection. In FIG. 9, a two-channel pipe 926 is thermally bonded to heat radiating panels 934 and 944. Inner bumpers 946 and 948 provide a second line of defense, and outer bumpers 946' and 948' provide primary protection against micrometeroids impinging from a direction substantially normal to the plane of panels 934 and 944.

FIGS. 11a through 11h illustrate various cross-sectional configurations of two-channel pipes which may be formed by extrusion and which are satisfactory for use as a multichannel pipe in the various embodiments of the invention. The extrusion of FIG. 11h includes extruded fluid channels 1140 and 1142, and further extruded channels 1188 and 1190. This configuration is light in weight and inherently defines a pair of bumpers 1184, 1186.

Figure 12:
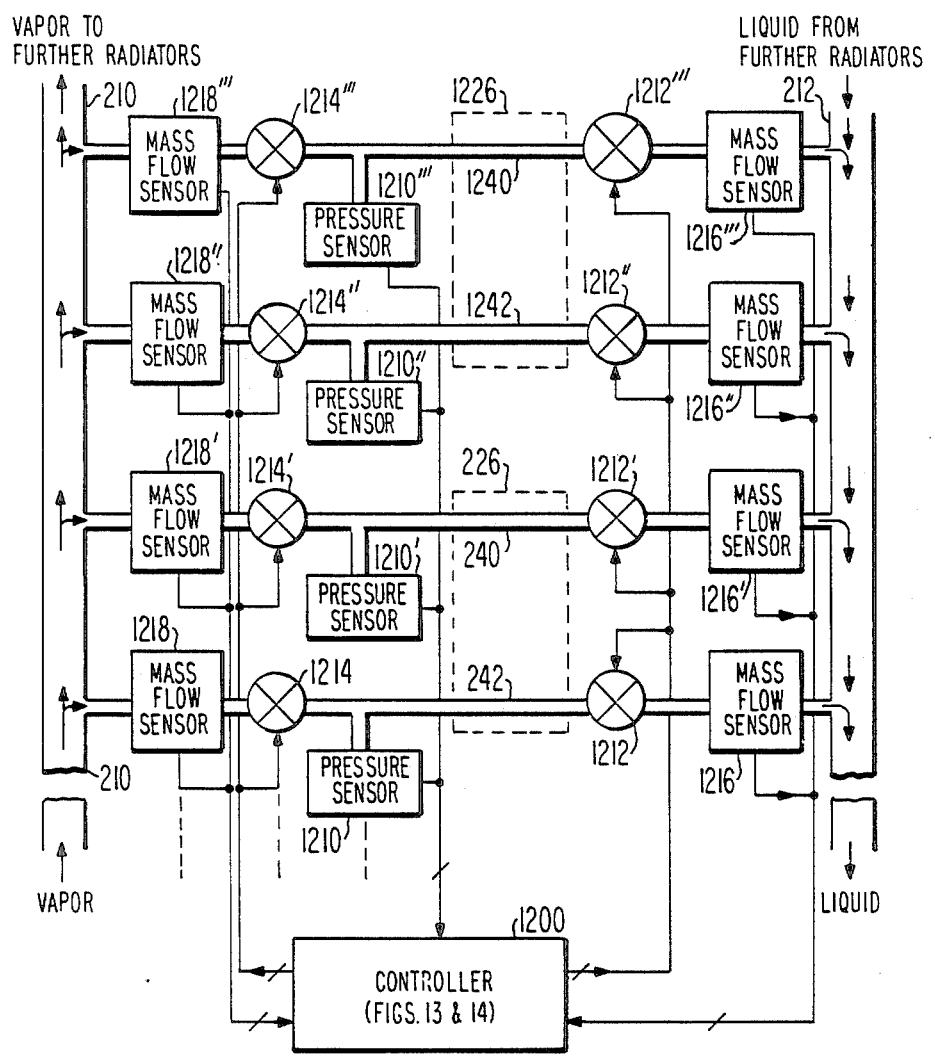
FIG. 12 is a schematic diagram of a control system according to the invention.

FIG. 12 is a schematic diagram illustrating the sensors, valves and control functions which through their interaction establish the presence of perforation which allows a channel extending through the multichannel pipe of a radiator to leak. In FIG. 12, the sensors and valves associated with a radiator 226 and a radiator 1226 are illustrated. Radiator 226 includes channels 240 and 242, and radiator 1226 includes channels 1240 and 1242. Other radiators (not illustrated) may be coupled to manifolds 210 and 212.

A shut-off valve 1212 is located on the liquid side of channel 242, and a further shut-off valve 1214 is connected to the vapor side of channel 242. A pressure sensor 1210 is connected directly to channel 242 without an intermediary valve. A mass flow sensor 1216 is connected between valve 1212 and liquid manifold 212, and a further mass flow sensor 1218 is connected between vapor manifold 210 and valve 1214. Pressure sensor 1210 and mass flow sensors 1216 and 1218 are coupled by multiconductor cables to a controller 1200 to supply information to the controller relative to the pressure in, and mass flow rates through channel 242. Controller 1200 is also addressably coupled by multiconductor cables to valves 1212 and 1214 for selectively closing the valves for preventing flow of coolant from manifolds 210 and 212 into channel 242.

Similarly, channel 240 of multichannel pipe 226 is connected directly to a pressure sensor 1210' and to output and input shut-off valves 1212' and 1214', respectively. Between vapor manifold 210 and valve 1214' is a mass flow sensor 1218', and between valve 1212' and liquid manifold 212 is a further mass flow sensor 1216'

Similarly, channel 1242 of multichannel pipe 1226 is connected in series with mass flow sensor 1218″, valve 1214″, a further valve 1212″ and a further mass flow sensor 1216″, and is connected directly to a pressure sensor 1210″. Further channel 1240 of multichannel pipe 1226 is connected to mass flow sensor 1218‴, valve 1214‴, valve 1212‴, and mass flow sensor 1216‴, and is directly connected to pressure sensor 1210‴. Each of the sensors can be individually read and each valve individual actuated under control of controller 1200. Pressure sensors, mass sensors and valves are well known in the art and need no further description.

Figure 13:
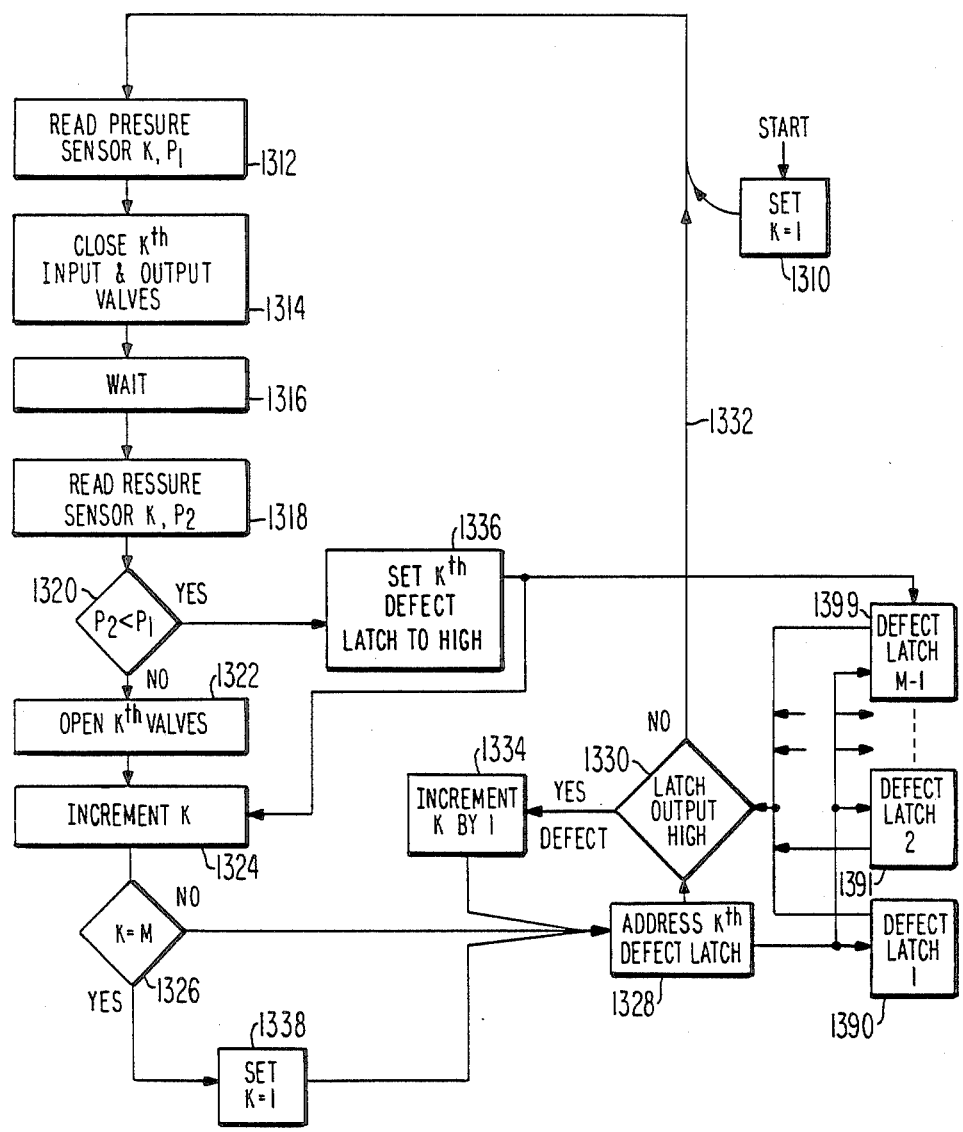
FIGS. 13 and 14 are functional flow diagrams illustrating the operating of the controller of FIG. 12.

FIG. 13 is a functional logic flow diagram describing the sequence of operations of controller 1200 in sequentially testing each fluid channel of each multichannel pipe for small leaks. In general, the method for testing for small leaks starts with all the valves open, and coolant flow through the channel to be tested. For example, in order to test channel 242 for small leaks, valves 1212 and 1214 are open for the flow of coolant therethrough. Pressure sensor 1210 is read, and valves 1212 and 1214 are then closed, thereby trapping coolant therein. If there is a small leak, the pressure will drop as a function of time. Depending upon the amount of liquid in the channel at the time the test begins, different periods may be required to sense a drop in pressure. After a period of time, pressure sensor 1210 is again read, and the difference in the readings is taken. If there is a change, this indicates that there is a small leak, and the logic is reset to maintain valves 1212 and 1214 closed permanently. If the pressure readings are the same, this indicates that the system is intact, and valves 1212 and 1214 are then opened to allow coolant flow while the controller goes onto test another channel. It should be noted that the testing for fine leaks does not require the use of mass flow sensors. The mass flow sensors are monitored continuously and in parallel in order to sense a sudden major rupture which might cause total loss of system coolant before the controller test sequence for small leaks could get around to testing the ruptured channel.

FIG. 13 is a functional logic diagram illustrating the sequence of operation for the testing of small leaks. The system is started and a running variable K is set equal to 1 in a block 1310. The logic flows to a block 1312 which represents the reading of the $K^{th}$ pressure sensor, which for K=1 is pressure sensor 1210 of FIG. 12. A pressure reading P1 is stored. The logic flows to a block 1314 which represents the closing of the Kth input and output valves, corresponding for K=1 to valves 1212 and 1214. The logic then flows to block 1316 which represents a wait or delay for a predetermined period of time selected to detect leaks of the appropriate magnitude. After the predetermined period, the logic flows to a block 1318 which represents the reading of the $K^{th}$ pressure sensor (for K=1, sensor 1210) and the storage of a second pressure reading P2. Decision block 1320 represents a comparison of P2 with P1. If P2 equals P1, the NO output of decision block 1320 indicates that the channel is intact, and directs the logic to a further block 1322 which directs the opening of the Kth valves (valves 1212 and 1214 of FIG. 12). The value of running variable K is incremented in block 1324 (to a value K=2, for example), and its value is compared with a value of M representing the end of a complete cycle of measurements. The value of M is predetermined and is one greater than the number of channels to be tested. If K is less than M, the NO output of decision block 1326 directs the logic to a block 1328 which represents the addressing of the Kth latch from among a plurality of defect latches 1390, 1391, ... 1399. The current output of the Kth defect latch can be a logic high or a logic low. A logic low output from the defect latch indicates that the corresponding channel has not previously been found to be defective, whereas a logic high condition indicates that the corresponding channel has been found to be defective during a previous test. Since it is undesirable to attempt further tests on a leaky channel because of the potential for loss of coolant during the test, those values of K for which a corresponding defect latch has a logic high output level are bypassed and are not tested. This is accomplished by a decision block 1330 which determines whether the output of the defect latch addressed by block 1328 is high or low. If the latch output is low, the NO output of decision block 1330 directs the logic by a path 1332 back to block 1312 to begin testing of the next channel (K=2) in the sequence. On the other hand, if the defect latch addressed by logic block 1328 has a logic high output level, decision block 1330 indicates by the YES output that this value of K should not be used, and the logic flows to a block 1334 which increments K by one and the logic returns to block 1328. In block 1328, the new value of K (K=3) is used to address the third defect latch. If its output is logic low (representing a fluid channel which has not previously been found to be defective), decision block 1330 allows the new value of K to be coupled to block 1312 to continue the sequence of tests.

Thus, channels known to be defective are not tested for small leaks. During the first test of a channel following a small puncture by a micrometeroid, the associated $K^{th}$ pressure sensor (for example, 1210″ of FIG. 12) is measured in block 1312 and the pressure reading P1 is stored. The associated valves 1212′, 1214′ are closed in block 1314, and a waiting period ensues pursuant to block 1316. The second reading of pressure sensor 1210″ will result in value P2 which is less than P1. Consequently, decision logic 1320 will produce a YES output which directs the logic to a block 1336 which sets the Kth defect latch to a logic high level, and returns the logic to block 1324 for an incrementing of the value of K. Eventually, all the channels will have been tested, and the value of K as incremented by block 1324 will equal M. At that time, decision block 1326 indicates by the YES output that the value of K should be reset to unity, and directs the logic to a block 1338 in which K is set equal to one. From block 1338, the logic flows to block 1328 which addresses the first defect latch to determine if the first channel has previously been determined to be defective, as described above. This sequence of operation continues until failure of the space vehicle, whether through cooling system failure or for other reasons.

Figure 14:
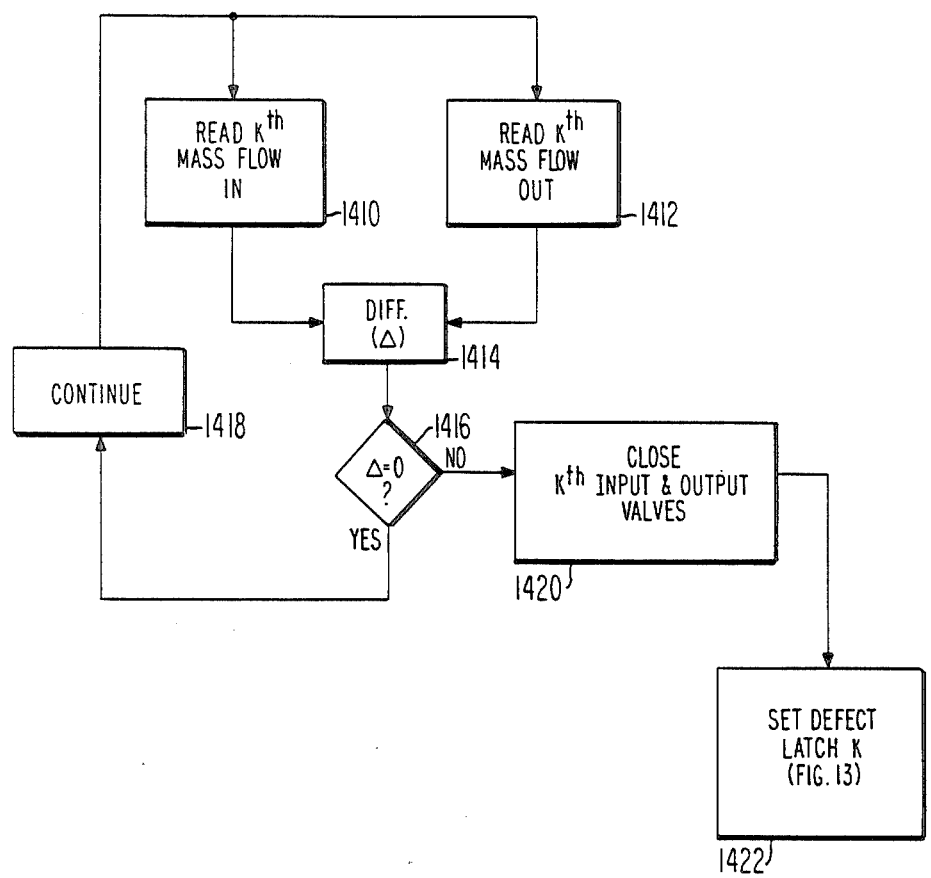

As mentioned, the sequential operation and the time delay required to make a test for small leaks may result in loss of coolant due to a large rupture which empties the cooling system quickly. FIG. 14 is a functional flow diagram representing one of K monitoring circuits, each of which is associated with one fluid channel. The arrangement of FIG. 14 continually reads a mass flow sensor such as mass flow sensor 1218′ in a block 1410 and reads a second mass sensor such as mass sensor 1216′ as represented by a second block 1412. The difference between the readings is generated in a block 1414, and the results are applied to a decision block 1416. If the difference (Δ) is equal to zero, the YES output of decision block 1416 directs the logic by a CONTINUE path 1418 back to blocks 1410 and 1412 for further readings of the input and output mass flow. If a large leak or sudden rupture occurs, some of the fluid entering the ruptured channel by way of mass flow sensor 1218' will leak from the rupture rather than flowing through mass flow sensor 1216'. Difference block 1414 will immediately generate a finite difference signal, which decision block 1416 will detect. The NO output of decision block 1416 will direct the logic to a block 1420 which represents the closing of the input and output valves 1212' and 1214' associated with defective channel 240 of pipe 226. Since there is a major rupture in channel 240, it is undesirable for the small leak sensing system to continue testing channel 240. For this purpose, the logic flows from block 1420 to further block 1422 which represents the setting to a logic high (defect) of the output of the Kth defect latch (FIG. 13), which corresponds to channel 240. It should be noted that testing for ruptures does not require the use of pressure sensors such as 1210', although they could be used to verify the existence of a rupture.

The described system closes off defective fluid channels in a multichannel pipe. This results in a reduction in capacity, but the heat radiator with which the pipe is associated remains functional, so long as one or more channels of the multichannel pipe remains operable.

Other embodiments of the invention will be apparent to those skilled in the art. In particular, any impact resisting filler may be used for a filler within chambers 50, 52 (FIG. 2c); such a filler might be ceramic balls or the like. Methods for detection of penetration of a coolant chamber other than those described may be used, such as an acoustic sensor coupled to the fluid chamber and also coupled to a memory in which characteristic spectra of various types of punctures are stored for comparison therewith. Other fittings, valves, coupling and the like may be used for various other purposes associated with cooling without departing from the spirit of the invention. Rather than comparing two sequential pressure readings (P1 and P2 during the slow leak test, the second pressure reading P2 may be compared with a predetermined reference value.

What is claimed is:

1. A heat transfer arrangement for removing heat from a space vehicle, comprising:
   a vapor plenum adapted for receiving heat-laden coolant vapor for distributing said coolant vapor to a plurality of vapor output ports;
   a liquid plenum including a plurality of input ports for receiving coolant liquid for collecting said coolant liquid and for making said coolant liquid available to a source of waste heat for cooling thereof;
   a thermally conductive pipe including first and second ends and first and second independent fluid channels extending therethrough from said first end to said second end;
   fluid coupling means coupled to said first and second fluid channels at said first and second ends, to said vapor and liquid plenums for controllably coupling coolant fluid through said first and second channels from said vapor plenum to said liquid plenum;
   at least one thermally conductive radiator panel thermally coupled to said pipe and including a portion adapted for substantial black-body radiation into space, whereby said pipe transfers heat from coolant fluid flowing therethrough to said panel for radiation thereof, thereby cooling said fluid, whereby coolant vapor flowing into said first and second channels from said vapor plenum has its latent heat removed, and condenses to a liquid form which in passing towards said liquid plenum further loses sensible heat and decreases in temperature, the environment of said space vehicle being populated by micrometeroids possessing a distribution of kinetic energy ranging from insignificant amounts to amounts sufficient to penetrate the walls of said pipe, which penetration might create an aperture in one of said first and second channels through which said coolant can escape, thereby rendering said heat transfer arrangement ineffective;
   sensing and control means coupled to said fluid coupling means and to said first and second fluid channels for sensing a coolant leak from one of said first and second fluid channels and for controlling said fluid coupling means for decoupling said vapor and liquid plenums from said one of said first and second channels, whereby coolant fluid flow through the other of said first and second channels maintains a substantial amount of capacity of said heat transfer arrangement.

2. A heat transfer arrangement according to claim 1 wherein said fluid coupling comprises first and second controllable valves for coupling said first and second fluid channels, respectively, to said vapor plenum, and third and fourth controllable valves for coupling said first and second channels, respectively, to said liquid plenum.

3. An arrangement according to claim 2 wherein said sensing and control means comprises:
   first and second mass sensors coupled to said first fluid channel near said first and second ends, respectively, of said pipe;
   reading means coupled to said first and second mass flow sensors for reading said first and second mass flow sensors to form first and second mass flow signals;
   comparison means coupled to said reading means for comparing said first and second mass flow signals and for generating a defect signal in response to a difference therebetween; and
   valve control means coupled to said comparison means and to said first and third valves for operating said valves to a closed condition in response to said defect signal.

4. A heat transfer arrangement according to claim 2 wherein said sensing and control means comprises:
   first and second pressure sensing means coupled to said first and second channels, respectively;
   means for establishing a predetermined test period for testing said first channel;
   means for reading said first pressure sensing means before said predetermined test period and for storing a first pressure reading;
   means for operating said first and third valves to a closed condition at the beginning of said predetermined test period;
   means for reading said first pressure sensing means near the end of said predetermined test period to form a second pressure reading;
   means for comparing said first and second pressure readings and for generating a defect signal in response to a difference; and
   means for operating said first and third valves to an open condition at the end of said predetermined test period in the absence of said defect signal and for leaving said first and third valves permanently closed in the presence of a defect signal, whereby puncture of said first channel results in shutting off said first channel but not said second channel to the flow of coolant fluid.

5. An arrangement according to claim 4 wherein said sensing and control means comprises:
first and second mass sensors coupled to said first fluid channel near said first and second ends, respectively, of said pipe;
reading means coupled to said first and second mass flow sensors for reading said first and second mass flow sensors to form first and second mass flow signals;
comparison means coupled to said reading means for comparing said first and second mass flow signals and for generating said defect signal in response to a difference therebetween.

6. A heat radiator for a space vehicle, comprising:
an elongated vapor manifold adapted for receiving coolant vapor to be cooled;
an elongated liquid manifold adapted for receiving cooled liquid coolant, said elongated liquid manifold being arranged in a substantially parallel relationship with said elongated vapor manifold;
first and second spaced-apart panels which are substantially planar and parallel over a principal portion of their area, said first and second panels being formed from heat-conductive material;
an elongated pipe-like structure in the form of a thermally conductive multiple-channel pipe including first and second ends and an outer surface, and at least first and second channels extending from said first end to said second end, said elongated pipe-like structure lying in a plane and being located between said first and second panels with a portion of said outer surface thermally bonded to said first panel and another portion of said outer surface thermally bonded to said second panel, and further being located with said first end adjacent said vapor manifold and said second end adjacent said liquid manifold;
fluid coupling means coupled to said first and second ends of said pipe-like structure, and to said vapor and liquid manifolds for controllably coupling at least said first and second channels at one end of said first and second ends to said vapor manifold and at the other end of said first and second ends to said liquid manifold, whereby micrometeroids impinging upon said elongated pipe-like structure from a direction approximately normal to said plane are most likely to penetrate through the walls of said pipe-like structure thereby forming an aperture through which said coolant can escape;
a first elongated bumper located on a side of said first panel remote from said pipe-like structure, said first bumper being dimensioned and located for intercepting micrometeroids impinging on said first panel near said pipe-like structure from a direction approximately normal to said plane;
a second elongated bumper located on a side of said second panel remote from said pipe-like structure, said second bumper being dimensioned and located for intercepting micrometeroids impinging on said second panel near said pipe-like structure from a direction approximately normal to said plane, whereby a micrometeroid must penetrate one of said first or second bumpers and a corresponding one of said first and second panels before it can transfer a substantial amount of its kinetic energy to said pipe-like structure, but an energetic micrometeroid may nevertheless penetrate through said walls of said pipe-like structure, thereby forming an aperture through which said coolant can escape from one of said first and second channels; and
penetration sensing and control means coupled to said pipe-like structure and to said fluid coupling means for sensing the formation of an aperture through which said coolant can escape and for controlling said coupling means for decoupling at least one of said first and second Channels from both said vapor and liquid manifolds.

7. A radiator aocording to claim 6 wherein said elongated pipe-like structure is formed into a M-shaped curve in said plane.

8. A radiator according to claim 6 wherein said elongated pipe-like structure is formed into a loop structure, whereby said elongated pipe-like structure crosses near a crossover point, and said elongated pipe-like structure lies in said plane except near said crossover point.

9. A radiator according to claim 8 further comprising a third bumper overlying said pipe-like structure near said crossover point to thereby extend protection to said crossover region.

10. A radiator according to claim 6 wherein said penetration sensing and control means comprises a mass flow rate sensor coupled to one of said first and second channels.

11. A radiator according to claim 6 wherein said penetration sensing and control means comprises:
first and second mass flow sensors coupled to said first and second ends of said first channel, respectively, for providing first and second mass flow signals indicative of the mass flow into and output of said first channel;
difference means coupled to said first and second mass sensors for taking the difference between said first and second mass flow signals to produce a difference signal;
threshold comparison means coupled to said difference means for comparison of said difference signal with a reference level for producing a fault control signal indicative of puncture of said first channel; and
second coupling means for coupling said fault control signal to said fluid coupling means for decoupling said first channel from said vapor and liquid manifolds in response to said fault control signal.

12. A radiator according to claim 6 wherein said penetration sensing and control means comprises:
means for controlling said fluid coupling means for temporarily decoupling said first fluid channel from said vapor and liquid manifolds for a predetermined interval;
means for sensing pressure in said first channel to produce a first pressure signal before said predetermined interval;
means for storing said first pressure signal;
means for sensing fluid pressure in said first channel during said predetermined interval to produce a second pressure signal;
comparison means for comparing said first and second pressure signals and for generating a fault indicative signal if said signals differ; and
means for controlling said fluid coupling means for coupling said first channel with said vapor and liquid manifolds in the absence of said fault indicative signal.

* * * * *